Oct. 29, 1957 W. B. WESTCOTT, JR 2,811,326
RETRACTABLE AIRCRAFT LANDING GEAR
Filed Feb. 5, 1954 3 Sheets-Sheet 1
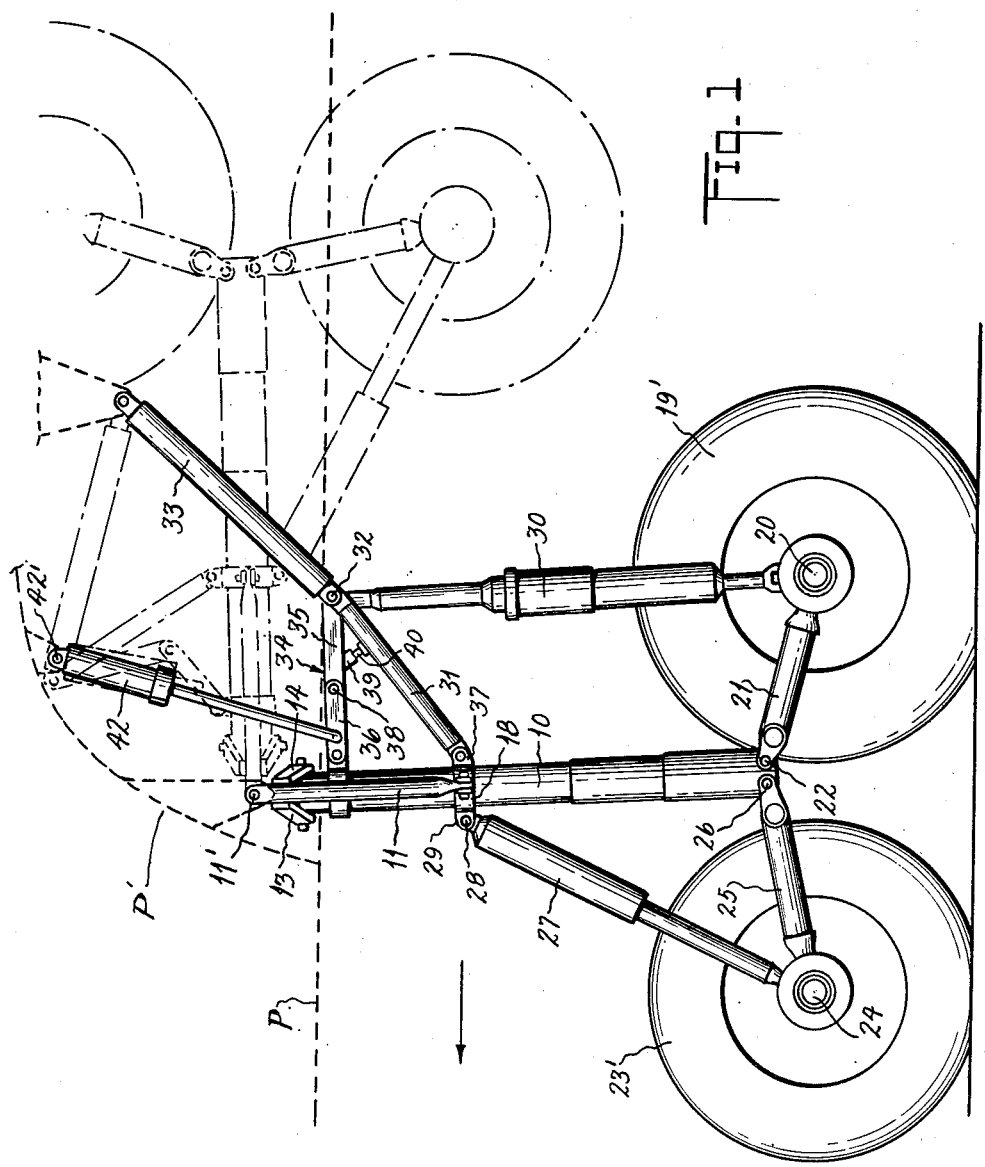
INVENTOR.
WILLIAM B. WESTCOTT, JR.
BY
*Campbell Brumbaugh Free & Graves*
ATTORNEYS Oct. 29, 1957 W. B. WESTCOTT, JR 2,811,326
RETRACTABLE AIRCRAFT LANDING GEAR
Filed Feb. 5, 1954 3 Sheets-Sheet 2
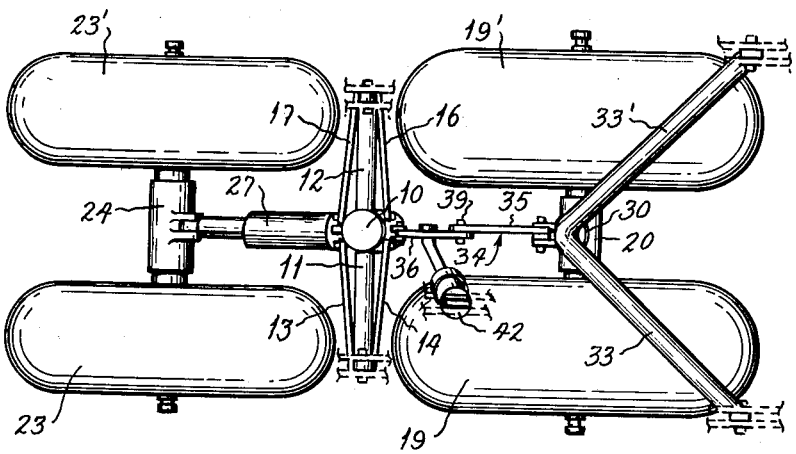
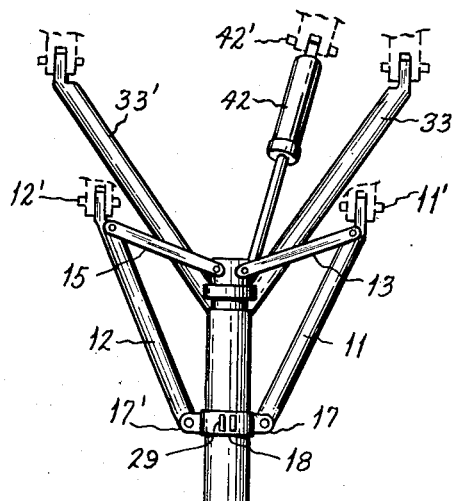
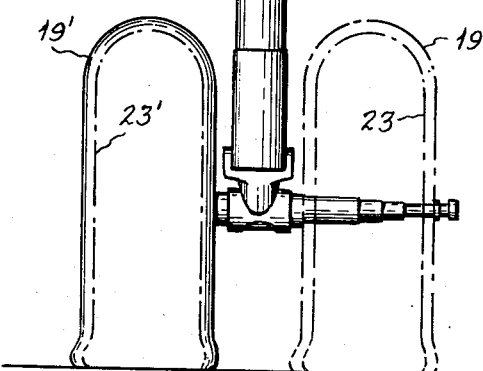
INVENTOR.
WILLIAM B. WESTCOTT, JR.
BY
ATTORNEYS Oct. 29, 1957     W. B. WESTCOTT, JR     2,811,326
RETRACTABLE AIRCRAFT LANDING GEAR
Filed Feb. 5, 1954                         3 Sheets-Sheet 3
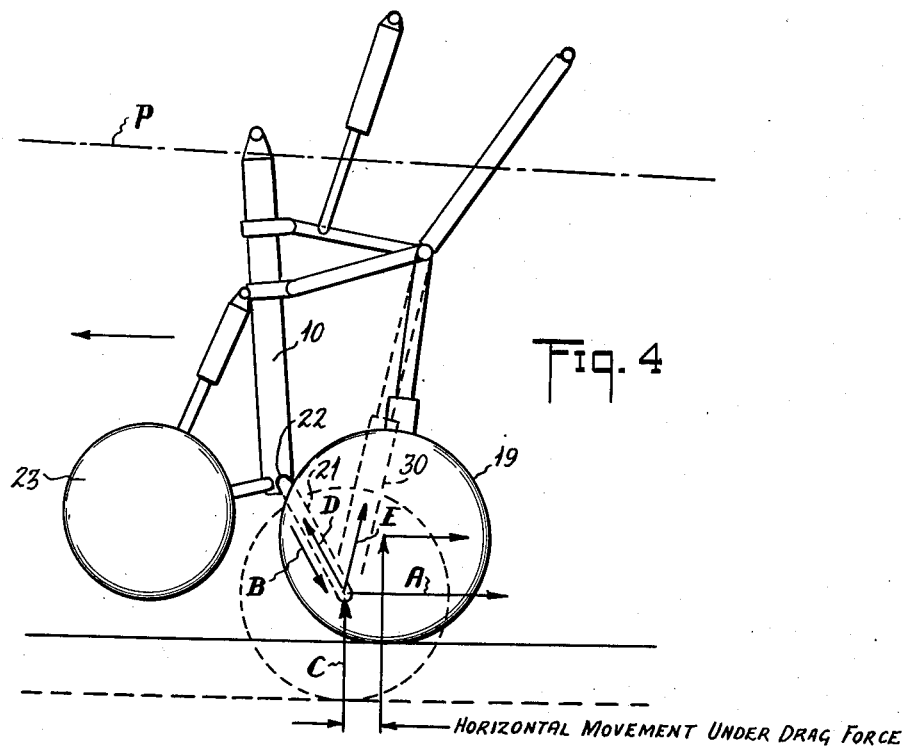
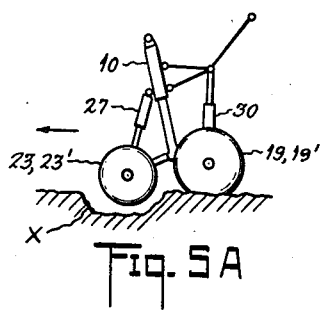 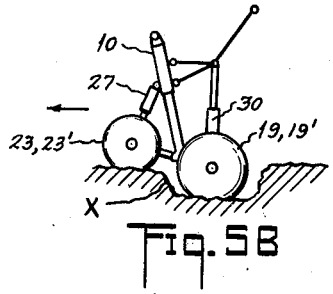
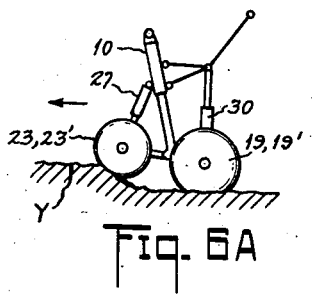 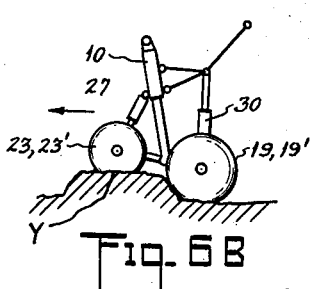
INVENTOR.
WILLIAM B. WESTCOTT, JR.
BY
*Campbell Brumbaugh Free & Graves*
ATTORNEYS

2,811,326

RETRACTABLE AIRCRAFT LANDING GEAR

William B. Westcott, Jr., Hagerstown, Md., assignor to Fairchild Engine and Airplane Corporation, Hagerstown, Md., a corporation of Maryland Application February 5, 1954, Serial No. 408,378

5 Claims. (Cl. 244—102)

This invention relates to aircraft landing gear, and has particular reference to landing gear enabling large and heavy aircraft to land and take off from uneven surfaces, such as bomb- and shell-pitted runways, and surfaces having varying load-supporting areas, such as those encountered during military operations to and from temporary or unprepared landing fields, although the invention is not limited to that use.

One of the major problems confronting the designer of large and heavy aircraft is the necessity for providing a landing gear which will adequately absorb the shocks encountered in landing and during all ground operations and at the same time provide adequate load distribution for operation on soft or uneven terrain. Although the current conventional cantilever strut landing gear usually provides sufficient shock absorption facility for vertical loads, it inadequately accommodates absorption of loads due to spin-up of the wheels, spring-back landing reaction and loads encountered in traversing obstacles and depressions in the ground or runway surfaces without an excessive structural weight. Unless the strength of conventional landing gear is materially increased to enable it to accommodate such excessive loading, failure is likely to occur. However, the increased weight accompanying the requisite increase in strength is not always justified, and has led to the design of compromise gear arrangements such as the dual tandem wheel type which, although providing the desired load distribution on smooth terrain together with the usual vertical shock-absorbing qualities of the conventional gear, still does not afford proper landing for uneven terrain or absorb the horizontal loads, although some alleviation of the spin-up and spring-back loads is possible by proper no-load rigging of the gear structure. Thus, when the front wheels of a four-wheel tandem truck type gear drop into a depression, the rear wheels are rotated upwards and hence do not carry the necessary load, which also occurs when brakes are applied so that braking becomes less effective.

In a preferred embodiment of the landing gear of this invention, a four-wheel truck type of gear is provided, two or more of which may be employed as the main landing gear of the craft, and each comprising a rigid and non-extensible or contractible main supporting strut pivoted at its upper end to the aircraft structure for retraction and carrying by arms pivoted on its lower end the front and rear axle and wheel assemblies. The front wheel assembly is connected to the main strut by a front shock strut, and the rear wheel assembly is connected by a rear shock strut to a three-way pivotal linkage, which includes a non-extensible link connection from the upper end of the rear shock strut to the aircraft structure, a second non-extensible linkage connection from the upper end of the rear shock strut to the main load strut, thereby forming with the rear wheel assembly arm a generally parallel type of connection between the rear shock strut and the main load strut, whereas the third linkage connection from the upper end of the rear shock strut comprises a toggle to the upper end of the main load strut normally held in straight, rigid position by a power member connected to the aircraft and retractible to break the toggle for purposes of retracting the gear about the pivotal connection of the main load strut to the aircraft. The wheels and struts are arranged so that in "no-load" position, i. e., when the gear is extended preparatory to landing, the rear wheels extend downwardly below the front wheels so as to engage the ground first and are designed to take upwards of two-thirds of the static load with the front wheels taking the remainder.

It will be seen that the flexibility afforded by the rear shock strut and the linkage connections between the rear wheel assembly and the main strut of the landing gear of this invention precludes the application of severe bending stresses to the main load strut due to wheel spin-up on landing, and that the toggle linkage automatically locks the gear in extended position without requiring separate locking means, and that the front wheels, although taking less static load than the rear wheels, aid the latter in distributing the load over varying load sustaining areas as well as enabling the gear to negotiate rough and unprepared landing fields.

For a more complete understanding of the invention, reference may be had to the accompanying drawings, in which:

Figure 1 is a side elevation of the four-wheel truck type landing gear unit of this invention, the front and rear wheels on the near side being omitted for clarity;

Fig. 2 is a front view in which all wheels except the left rear wheel are shown omitted, although their relative positions are indicated by broken lines;

Fig. 3 is a plan view of the gear as seen removed from the aircraft structure;

Fig. 4 illustrates diagrammatically the manner in which spin-up forces are absorbed by the gear of the present invention; and Figs. 5A, 5B, 6A and 6B illustrate diagrammatically certain typical operational conditions of the landing gear of this invention.

Referring to Figs. 1 and 2 of the drawings, the primary or main load strut 10 is rigid and non-extensible or non-contractible, and is pivoted at its upper end to an aircraft structure P, shown in phantom line, from which it extends downwardly and rearwardly at a slight angle of about 10° to the vertical when the craft is at rest. The main load strut 10 is attached to the aircraft structure P by a linkage consisting of a pair of lateral main supporting links 11 and 12 and four brace links 13, 14, 15 and 16. The main links 11 and 12 are pivoted at their upper ends 11' and 12' to the aircraft structure P and attach at their lower ends to a pair of studs 17 and 17' on a collar 18 which encircles and is fixed to the main strut 10 at some suitable distance from its upper end, such as about one-third to one-half the distance down from the upper end 10, depending upon requirements. As shown especially in Fig. 3, the main links 11 and 12 spread upwardly and outwardly from the strut 10 so as to brace it against side loads in cooperation with the links 13, 14, 15 and 16 which join the main links 11 and 12 to the upper end of main strut 10.

A pair of rear landing wheels 19 and 19' are journalled on the opposite ends of rear axle assembly 20 whose midpoint is supported by an arm 21 pivotally attached to the lower end of strut 10 as by bolt 22. A pair of forward wheels 23, 23', preferably of smaller diameter than rear wheels 19, 19', are similarly journalled on the opposite ends of front axle assembly 24 which is supported at its midpoint by an arm 25 pivoted on the lower end of strut 10 as by bolt 26.

The forward axle assembly 24 is provided with shock absorbing means 27, which may be one of the standard hydraulic type units available for the purpose, and which joins the forward axle assembly 24 with the main strut 10 by pin 28 inserted through lug 29 on collar 18.

The rear axle assembly 20 is also provided with a similar shock absorbing strut 30 which is pivotally attached at its lower end to the axle assembly 20 and at its upper end by bolt 32 to the upper end of a diagonal strut 31 which is attached at its lower or opposite end to a lug 37 on collar 18. The bolt 32 on the upper end of diagonal strut 31 is connected by diagonal braces 33, 33' to the aircraft structure and by the strut assembly 34 to the upper end of the main strut 10.

The strut assembly 34 consists of two links 35 and 36 joined by a connecting pin or bolt 38 which allows the assembly to break at that point to form a toggle type linkage. An extension 39 on link 35 abuts against the strut member 31 to limit the travel past center of the breaking point at connection 38. The extension 39 may be threaded to receive a bolt 40 which may be screwed in or out of extension 39 to vary the locked position of the toggle linkage 34, which accordingly stabilizes the linkage assembly 10, 30, 31, 33, 33' to prevent movement of point 32 under loaded conditions, and is subject to deflection only when its toggle mechanism is broken by an upward movement of its link 36.

The upward deflection of link 36 of toggle strut assembly 34 is effected in order to retract or extend the entire landing gear by an actuator 42, which may be an electrically driven screw or hydraulic cylinder and piston type, pivoted at some suitable point 42', to the aircraft structure P. The upward contraction of actuator 42 raises the link 36 to break the toggle strut 34 about pin 38 in the manner indicated by dotted lines in Fig. 1, to thereby retract the gear within nacelle P' in the aircraft structure P. Extension of actuator 42 in the opposite direction will lower the gear and force and hold the toggle strut assembly 34 against stop 39, 40 in the straight position shown in Fig. 1, where it locks the gear against becoming unlocked under the most severe operating conditions. The automatic lock thus afforded by toggle strut assembly 34 in cooperation with actuator 42 and stop 39, 40 makes it unnecessary to provide the usual separate lock-down device found on most aircraft landing gear.

In operation of the landing gear of this invention, and considering the effect of spring-back forces caused by wheel spin-up at the instant when the wheel touches the ground on landing, Fig. 4 indicates the manner in which the present invention relieves this condition. When the gear has been lowered preparatory to landing, and consequently is not under a load, the extended rear shock strut 30 causes the heavier rear wheels 19 and 19' to extend further downwardly than do the smaller and lighter front wheels 23, 23', so that the rear wheels 19, 19' engage the ground first. The engagement of the stationary rear wheels 19, 19' with the ground, which is moving relatively to the wheels at high speed, results in a very high drag force A rearwardly because of the inertia of the wheels as they are "spun-up" to full landing speed in a very short increment of time.

In the conventional gear this high drag load resolves into a bending moment about some point in the landing gear structure and, due to the natural resilience of the material, the structure bends rearwardly to snap back when the wheels spin-up almost instantaneously to full operating speed, thereby severely stressing the structure and impairing the freedom of operation of shock absorbers. However, in the landing gear of the present invention, the vertical landing load C is used to offset a portion of the wheel spin-up drag load A by resolving it into component D as a compression load in link 21 and component E as an axial compression load in shock strut 30. The compression load D therefore counteracts the tension load B in link 21 due to wheel spin-up drag A to either reduce the load or eliminate the load at point 22, depending upon the magnitude of the loads and the actual measurements of the landing gear structural members. Thus, the entire drag load A caused by wheel spin-up which would normally be transmitted to the main load member 10 as a bending moment applied at point 22 through link 21 is harmlessly resolved in the landing gear of this invention.

As the rear shock strut 30 contracts under landing load from the dotted line position to the solid line position shown in Fig. 4, the rear wheel assembly moves upwardly about pivot 22 until the front wheels 23, 23' engage the ground and assume about one-third of the static aircraft load and thus aid in distributing the total static load over an area having varying load-substaining capacity such as an unprepared field or other untreated surface.

The front wheel assembly also performs additional and important functions as the aircraft negotiates uneven terrain whether landing, taxiing or taking off. Some of these functions are illustrated in Figs. 5A, 5B, 6A and 6B. Thus, should the gear encounter a deep hole X in the ground as shown in Fig. 5A, the "no-load" position of the front shock strut 27 holds the front wheels 23, 23' upwardly so that they do not drop into the hole X, the rear wheels 19, 19' meanwhile sustaining the full load. As the aircraft moves forwardly, the front wheels 23, 23' engage the ground at the opposite or far edge of the hole X and carry the load, while the rear wheels 19, 19' rock into and out of the hole X as the front shock strut 27 retracts under the load, as shown in Fig. 5B.

Assuming the opposite condition from that shown in Figs. 5A and 5B, i. e., where the aircraft encounters an obstacle such as a ridge or rock indicated as Y in Figs. 6A and 6B, the front wheels 23, 23' climb the obstacle as the front shock strut 27 retracts. The front wheels gradually take more of the load from the rear wheels 19, 19' until the front wheels surmount the obstacle as shown in Fig. 6B, and thus assume the load while permitting the rear wheels 19, 19' to surmount the obstacle and then reassume the load under conditions similar to that depicted in Fig. 5A. In varying but similar ways, the landing gear of this invention enables cargo and heavy aircraft to negotiate uneven and unprepared terrain whether or not its load-sustaining properties are known in advance, and each landing gear, assuming there are two or more, acts independently, accommodating the conditions it meets in the manner described.

Although a preferred embodiment of the invention has been illustrated and described herein, it is to be understood that the invention is not limited thereby, but is susceptible of changes in form and detail within the scope of the appended claims.

I claim:

1. In landing gear for an aircraft, the combination of a rigid main strut adapted for connection at one end thereof to an aircraft and having an opposite lower end, an arm pivoted at one end on the lower end of said main strut and extending outwardly therefrom, a wheel journalled on the other end of said arm, a first strut member pivoted at one end intermediate the upper and lower ends of said main strut and having another end extending therefrom, an axially extensible and contractible shock absorbing strut pivotally connecting said another end of said first strut member and said arm, a collapsible toggle connecting said another end of said first strut member to said main strut adjacent to its upper end and a second strut member having one end pivotally connected to said another end of said first strut member and its other end adapted for connection to an aircraft.

2. In landing gear for an aircraft, the combination of a rigid main strut having an upper end adapted for pivotal connection with an aircraft and a lower end, an arm pivoted at one end on the lower end of said main strut and having another end extending therefrom, a wheel journalled on said another end of said arm, a first strut member pivoted at one end intermediate the upper and lower ends of said main strut and having another end extending therefrom, an axially extensible and contractible shock absorbing strut pivotally connecting said another end of said first strut member and said arm, a collapsible toggle connecting said another end of said first strut member to said main strut adjacent to its upper end, a second strut member having one end pivotally connected to said another end of said first strut member and its other end adapted for pivotal connection to an aircraft, and means having a portion connected to said toggle and another portion adapted for connection to an aircraft for holding said toggle in normally straight position and for collapsing said toggle.

3. In landing gear for an aircraft, the combination of a rigid main strut having an upper end adapted for pivotal connection to an aircraft and a depending lower end, an arm having one end pivotally connected to the lower end of said main strut and its other end extending therefrom, a wheel journalled on said other end of said arm, a first strut member having one end pivotally connected to said main strut intermediate the upper and lower ends of said main strut and its other end extending therefrom, an axially extensible and contractible shock absorbing strut pivotally connecting said other ends of said strut member and said arm, a first toggle connecting said other end of said first strut member to said main strut adjacent to its upper end, means on said other end of said first strut member adapted for connecting it to an aircraft and forming a second toggle with said first strut member and power means adapted for connection to an aircraft and connected to said first toggle for breaking said toggles to retract said main and shock absorbing struts.

4. In landing gear for an aircraft, the combination of a rigid main strut having a lower end and an upper end adapted for pivotal connection to an aircraft, an arm having one end pivoted on the lower end of said main strut and its other end extending therefrom, a rear wheel journalled on the other end of said arm, a first strut member having one end pivotally connected to said strut intermediate its upper and lower ends and its other end extending therefrom, an axially extensible and contractible rear shock absorbing strut interposed between and pivotally connected to said other end of said strut member and said arm, a second arm pivoted at one end on the lower end of said main strut and having its other end extending in a direction opposite to said first arm, a front wheel journalled on said other end of said second arm, a front shock absorbing strut connecting said second arm to said main strut, a collapsible toggle connecting said other end of said first strut member to said main strut adjacent to its upper end, a second strut member having one of its ends pivotally connected to said other end of said first link and its other end adapted for pivotal connection to an aircraft, and power means adapted for connection to an aircraft and connected to said toggle for collapsing said toggle to retract said main and shock absorbing struts.

5. In landing gear for an aircraft, the combination of a rigid main strut having one end adapted for pivotal connection to an aircraft and a depending lower end, a first arm pivoted at one end on the lower end of said main strut and having another end extending therefrom, a rear wheel journalled on said another end of said arm, a first strut member having one end pivotally connected to said strut intermediate the upper and lower ends of said main strut and another end extending from said strut, an axially extensible and contractible rear shock absorbing strut pivotally connecting said another end of said strut member and said arm, a second arm having an end pivotally connected to the lower end of said main strut and another end extending therefrom in a direction opposite to said first arm, a front wheel journalled on said another end of said second arm, a front shock absorbing strut connecting said second arm to said main strut, a toggle connecting said another end of said first strut member to said main strut adjacent to its upper end, said toggle being normally straight and being collapsible to enable said first strut member to pivot relative to said main strut, a second strut member having one end pivotally connected to said another end of said first strut member and its other end adapted for connection to an aircraft, means engageable with said toggle when said toggle is straight for holding said toggle against collapsing in one direction from its normally straight position, and power means adapted for connection to an aircraft and connecting said toggle for collapsing said toggle in the other direction to retract said main and shock absorbing struts.

References Cited in the file of this patent

UNITED STATES PATENTS

| 1,932,094 | Hallot | Oct. 24, 1933 |
| 2,212,031 | Mercier | Aug. 20, 1940 |
| 2,277,896 | Albright | Mar. 31, 1942 |
| 2,331,082 | Smith | Oct. 5, 1943 |
| 2,444,319 | Winter | June 29, 1948 |
| 2,471,603 | Bishop | May 31, 1949 |
| 2,511,528 | Clark et al. | June 13, 1950 |
| 2,578,200 | Nicholl | Dec. 11, 1951 |
| 2,579,180 | Eldred | Dec. 18, 1951 |

FOREIGN PATENTS

| 650,547 | Great Britain | Feb. 28, 1951 |
| 725,307 | Germany | Sept. 18, 1942 |
| 1,090,016 | France | Oct. 13, 1954 |